United States Patent [19]
Koenig

[11] Patent Number: 4,725,944
[45] Date of Patent: Feb. 16, 1988

[54] ELECTRONIC COMMUNICATION CLOCKING MECHANISM

[75] Inventor: Kenneth G. Koenig, Campbell, Calif.

[73] Assignee: Tandem Computers Incorporated, Cupertino, Calif.

[21] Appl. No.: 926,812

[22] Filed: Oct. 31, 1986

Related U.S. Application Data

[63] Continuation of Ser. No. 551,301, Nov. 14, 1983, abandoned.

[51] Int. Cl.$^4$ .................... G06F 13/00; H03K 7/00
[52] U.S. Cl. ........................................ 364/200; 328/63
[58] Field of Search ... 364/200 MS File, 900 MS File; 307/265, 267, 269; 328/62, 63; 375/106, 111

[56] References Cited

U.S. PATENT DOCUMENTS

| | | | |
|---|---|---|---|
| 4,095,267 | 6/1978 | Morimoto | 364/200 |
| 4,191,998 | 3/1980 | Carmody | 307/269 X |
| 4,208,724 | 6/1980 | Rattlingourd | 307/269 X |
| 4,241,418 | 12/1980 | Stanley | 328/63 X |
| 4,405,979 | 9/1983 | Holtey | 364/200 |
| 4,407,014 | 9/1983 | Holtey | 364/200 |
| 4,414,637 | 11/1983 | Stanley | 328/63 X |
| 4,419,739 | 12/1983 | Blum | 375/106 X |
| 4,435,757 | 3/1984 | Pross | 364/200 |
| 4,463,440 | 7/1984 | Nishiura | 364/900 |
| 4,475,085 | 10/1984 | Yahata | 328/63 X |

Primary Examiner—Raulfe B. Zache
Assistant Examiner—Florin Munteanu
Attorney, Agent, or Firm—Townsend and Townsend

[57] ABSTRACT

Apparatus for providing a relatively constant clocking signal to a serial input/output device from a microprocessor regardless of whether the microprocessor is executing a normal instruction cycle or an extended cycle. A state machine is driven by the same clock which drives the microprocessor and a signal from the microprocessor indicating the presence of a normal or extended instruction cycle. The state machine and the clock which drives the microprocessor drive a clocking circuit which produces a first waveform if a normal instruction cycle is being executed, and a second waveform if an extended instruction cycle is being executed. Both waveforms are edge synchronized to the clock which drives the microprocessor.

2 Claims, 8 Drawing Figures

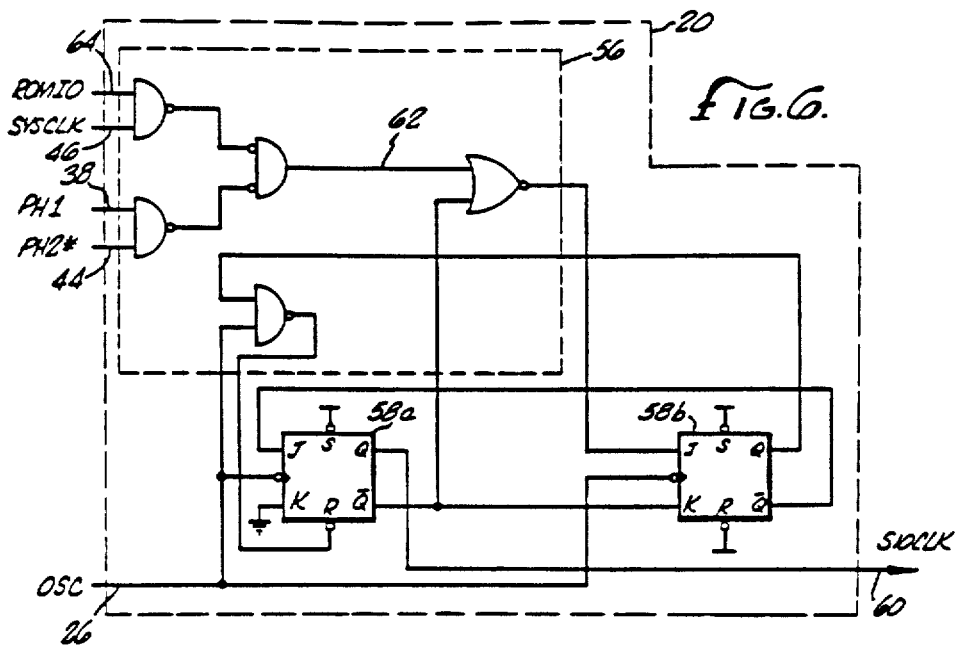

ELECTRONIC COMMUNICATION CLOCKING MECHANISM

This is a continuation of application Ser. No 06/551,301, filed 11/14/83, now abandoned.

BACKGROUND OF THE INVENTION

In the field of intelligent communications controllers, many controllers contain intelligent logic modules, such as microprocessors. These microprocessors are designed with clocking output signals that can be readily used by custom communications electronic devices that are used to transfer data for the microprocessor. The Z80SIO is a communications device that transfers data to various communications ports from the communications module wherein the microprocessor and Z80SIO (serial input-output) device is contained. Typically, the microprocessor transfers data between itself and the communications device. The communications device transfers that data over a communications line to a plurality of communications ports. The benefit of this type of transfer is that it decreases the use of the processing power of the microprocessor on data communications.

The sequential operation of these communications chips is synchronized with the microprocessor. The microprocessor communicates various clocking signals to the communications device during the execution of various microinstructions. These microinstructions are executed within variable instruction cycles. The various clocking signals synchronize the execution rate of the SIO device and the execution rate of the microprocessor. Thus, any variation in the microprocessor instruction cycle has a timing transfer effect on the communications device. Consequently, the communications device has a variable transfer rate. Moreover, when the microprocessor is executing instructions which have a minimum instruction cycle time, the SIO device is transferring at a maximum rate. When the microprocessor executes instructions which are longer than the minimum instruction cycle time, the communications device experiences a slower transfer rate.

Thus, one of the major disadvantages of modern communications controllers using the communications device is that they will experience a variable transfer rate. It is beneficial for computer systems not to experience variable transfer rates, but beneficial to maintain the highest transfer rate possible at all times.

SUMMARY OF THE INVENTION

It is an object of the present invention to improve the transfer rate of communications controllers. A conventional communications device experiences a consistently high transfer rate while remaining in sync with a microprocessor even though the microprocessor is experiencing a highly variable instruction execution rate. The use of special synchronization circuits facilitates the constant transfer rate of the communications device which is beneficial in computer systems. The communications device receives clocking signals that are not proportional to the number of instructions executed, but are proportional to the amount of execution time of the instructions. A high clocking rate to the communications device is maintained effectuating a relatively constant high communications transfer rate.

BRIEF DESCRIPTION OF THE DRAWINGS

FIG. 5 is a block diagram of the oscillator circuit that synchronizes the entire system.

FIG. 6 is a schematic diagram of the clocking circuit.

FIG. 7 depicts normal cycle waveforms of the clocking circuit.

FIG. 8 depicts waveforms of the clocking circuit during the extended cycle mode.

DESCRIPTION OF THE PREFERRED EMBODIMENT

Figure 1:
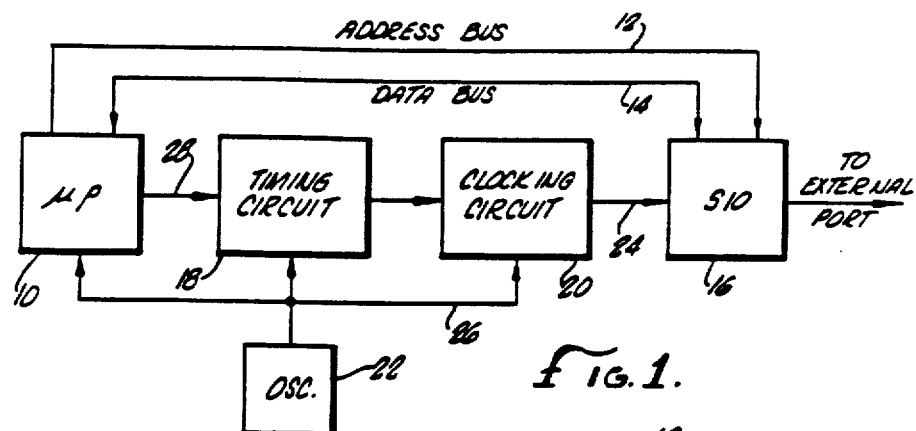
FIG. 1 is a block diagram of a microprocessor and a Serial Input-Output (SIO) device connected to a timing circuit, a clocking circuit and an oscillator circuit.

Referring to FIG. 1, a microprocessor 10 executes a series of instructions usually located in a memory device, not shown. Connected to the microprocessor 10 are an address bus 12 and data bus 14 which allow data communications within the system. The transmission of serial data is through an input-output device 16. The input-output device 16 is controlled by the microprocessor 10 when executing instructions. The input-output device 16 maintains a high transfer data rate with an external port, not shown. A timing circuit 18 and a clocking circuit 20 condition signals from the microprocessor 10 and an oscillator 22 and cause the input-output device 16 to maintain a high transfer rate regardless of the types of instructions the microprocessor 10 executes. Clocking signal on line 24 to the input-output device 16 does not vary significantly as the instruction execution rate of the microprocessor 10 varies. The timing circuit 18 and the clocking circuit 20 are used for conditioning a signal on line 28 from the microprocessor 10. The microprocessor 10 varies its output signal on line 28 depending upon the type of instructions executed. The oscillator 22 is connected to the microprocessor 10, the timing circuit 18 and the clocking circuit 20 to maintain synchronism within the system.

Figure 2:
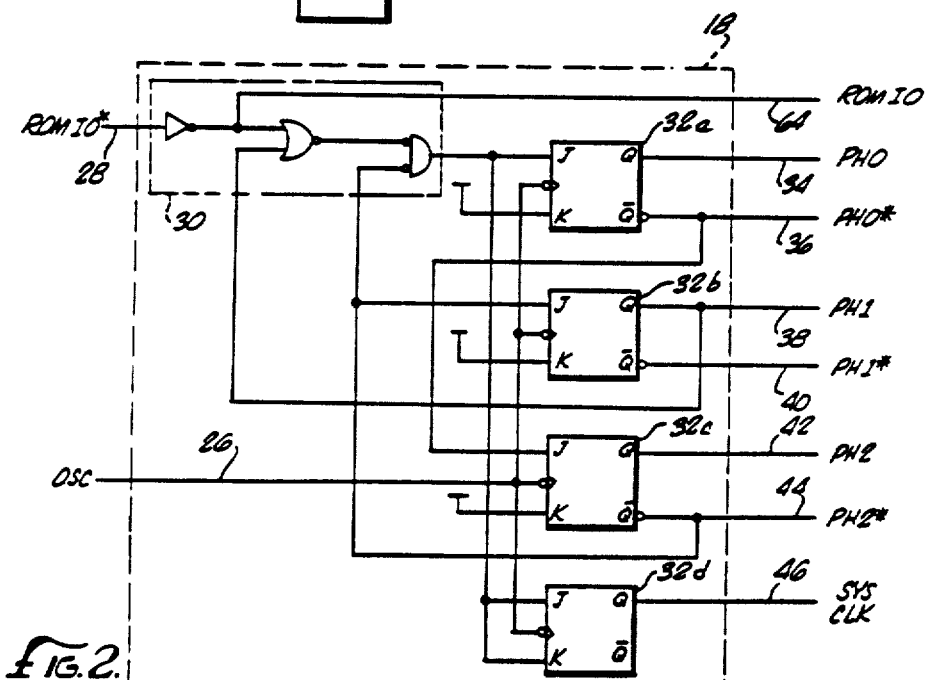
FIG. 2 is a block diagram of the timing circuit.

Referring to FIG. 2, the timing circuit 18 uses input combinatory logic 30 which drives a series of latches 32a through 32d, thereby forming a state machine comprising the timing circuit 18. The outputs of the latches 32 are the outputs of the timing circuit 18.

The timing circuit 18 has an oscillator input from the oscillator 22 on line 26. A ROM I/O* (read-only memory input-output inverted) control signal on line 28 is transmitted by the microprocessor 10. A Motorola 6809 device is used in the preferred embodiment as the microprocessor 10. The microprocessor 10 has two types of instruction cycles which are a normal or short cycle and a long or extended cycle. The ROM I/O* signal on line 28 distinguishes those two types of instruction cycles.

Figure 3:
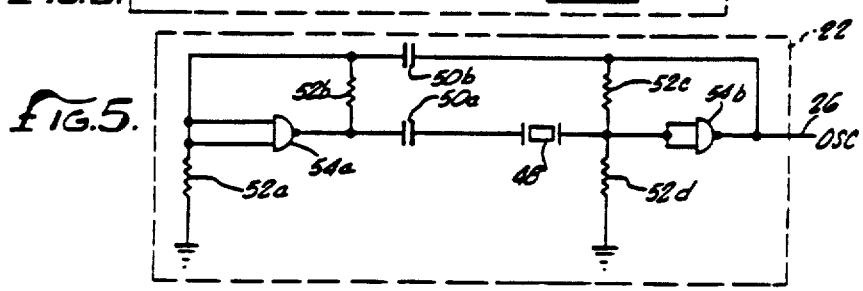
FIG. 3 depicts the normal cycle of the timing circuit when the microprocessor is in its minimum instruction cycle.
Figure 3:
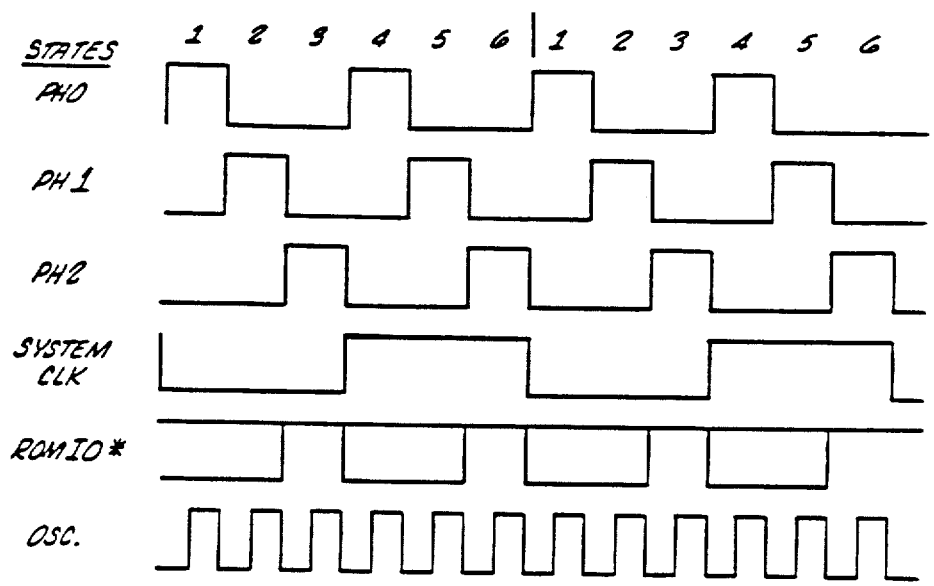

Referring to FIG. 2 and FIG. 3, the ROM I/O* signal on line 28 and oscillator input on line 26 are shown in timing relationship to the outputs of the timing circuit 18 and FIG. 3 depicts two complete cycles of the normal cycle. Each normal cycle has six states. The output signals of the timing circuit 18 include the phase zero signal on line 34, phase zero inverted signal on line 36, phase one signal on line 38, phase one inverted signal on line 40, phase two signal on line 42, phase two inverted signal on line 44, and system clock signal on line 46.

The oscillator input on line 26 is used for clocking the latches 32 and synchronization. The ROM I/O* signal on line 28 is a high voltage state (meaning a logic one) during states three and six thereby referencing a normal cycle. States one, two, four and five are don't-care states meaning that the ROM I/O* signal on line 28 could be a zero (low voltage state) or a one (high voltage state) and those states do not affect the operation of the timing circuit 18.

Figure 4:
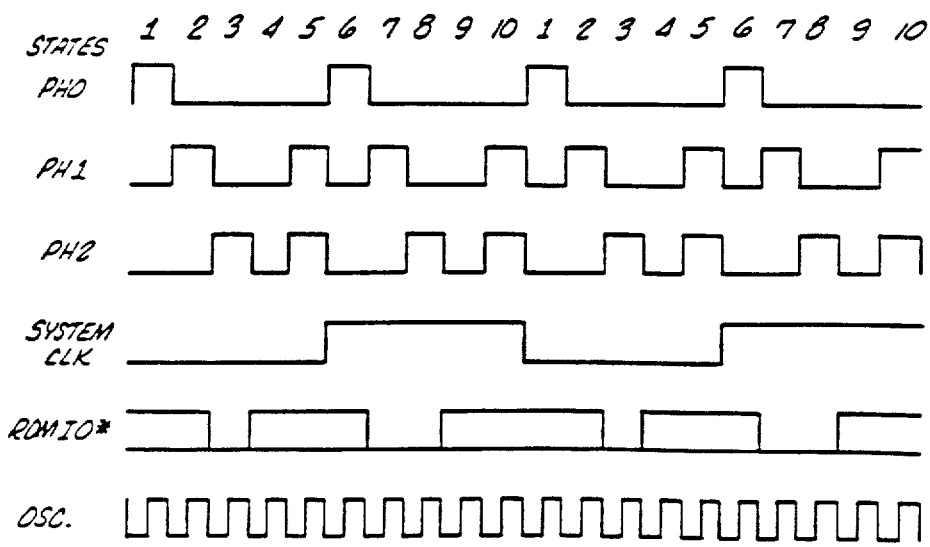
FIG. 4 depicts the extended cycle of the timing circuit when the microprocessor operates in an extended cycle mode.

Referring to FIG. 4, it should be noted there that during state three, the ROM I/O* signal on line 28 is necessarily low thereby referencing an extended cycle. The timing circuit 18 senses when the ROM I/O* signal on line 28 is low during state three. The phase zero signal on line 34, phase one signal on line 38, the phase two signal on line 42, and system clock signal on line 46 have extended cycle states, as shown in FIG. 4. The system clock signal on line 46 which maintains its square waveform, is now extended such that it is ten oscillator cycles long, as shown in FIG. 4, rather than six, as shown in FIG. 3. In both FIG. 3 and FIG. 4, the system clock signal on line 46 is low during the first half of the cycle and high during the last half of the instruction cycle.

Referring to FIG. 5, the oscillator circuit 22 comprises an crystal 48, a plurality of capacitors 50a and 50b, a plurality of resistors 52a, 52b, 52c and 52d, and a plurality of NAND gates 54a and 54b so as to provide an oscillating signal on line 26.

Referring to FIG. 6, the clocking circuit 20 is another state machine which also comprises combinatory logic 56 and a plurality of latches 58a and 58b. The output of the clocking circuit is the SIO clock signal on line 60. The SIO clock signal on line 60 is intended to drive the input-output device 16. The transfer rate of the serial input-output device 16 is to remain relatively constant during both types of instruction execution cycles.

Referring to FIG. 7, which is a normal clocking cycle waveform diagram, the relationship between a node signal on line 62, the oscillator input on line 26 and the SIO clock signal on line 60 is shown. The node signal on 62 remains zero during the normal cycle. The node signal on 62 determines whether or not there is an extended or normal cycle presently being executed. The node signal on line 62 is the logical AND function of a ROM I/O (non-inverted) signal on line 64, system clock signal on line 46, phase one signal on line 38 and phase two inverted signal on 44.

Referring to FIG. 8, which depicts an extended cycle waveform of the clocking circuit 20, in state seven, the node signal on line 62 goes high when the condition becomes true that the phase one signal on line 38 is high, phase two signal on line 42 is low, the system clock signal on line 46 is high and the ROM I/O signal on line 64 is high. This references the condition of the extended cycle.

It will be recalled from FIG. 4 that state seven does not exist in the normal cycle. State seven only exists in the extended cycle because the normal cycle has only six states whereas the extended cycle has ten states.

Referring again to FIG. 7, the SIO clock signal on line 60 maintains an oscillatory frequency that is one third that of the oscillator frequency during normal instruction execution cycles. One third of the oscillator frequency is the maximum rate of the SIO clock signal to the input-output device 16.

However, referring again to FIG. 8, it should be noted that at the beginning of the extended cycle at state one, the SIO clock signal on line 60 assumes its normal clocking rate consistent with the normal cycle. However, upon reaching state eight, the SIO clock signal on line 60 extends a pulse width from one and a half oscillator cycles to two and a half oscillator cycles. This extension causes the addition of a long pulse. Three high level pulses during the extended cycle are of a higher frequency than that otherwise had there been only two pulses during the extended cycle.

It should now become apparent that the relative frequencies of the SIO clock signal on line 60 during the extended cycle is three tenths that of the frequency of the oscillator clock signal on line 26. This three tenth oscillator frequency is approximately equal to that of the SIO clock signal on line 60 during the normal cycle. The SIO clock signal on line 60 assumes the rate of two pulses per six oscillator clocks during the normal cycle whereas the SIO clock signal on line 60 assumes the rate of three pulses per ten oscillator clocks during the extended cycles. A relatively constant high transfer rate derived from the SIO clock signal is now possible during both the extended and normal signals.

What is claimed is:

1. In a processing system of the type having a serial input/output device in data communication with a processor element operable, in response to a periodic clock signal produced by a clock generator, to execute certain instructions in a first instruction cycle time, and to execute other instructions in a second instruction cycle time, the first instruction cycle time being shorter than the second instruction cycle time, apparatus for producing a synchronized clock signal proportional to the first or the second instruction cycle time for operation of the serial input/output device, the apparatus comprising:

means included in the processor element for providing an indication of the first or the second instruction being executed by the processor element;

timing means, including state machine means, coupled to receive the periodic clock signal and the indication for sequentially assuming a first predetermined number of digital states when the processor element is executing the first instruction, and a second number of states when the processor element is executing the second instruction, the timing means including means for producing first and second output signals respectively indicative of the first or the second number of states; and clocking circuit means responsive to the first and second output signals and coupled to receive the periodic clock signal for producing the synchronized clock signal having a first predetermined number of clock pulses during the first instruction cycle time, and a second predetermined number of clock pulses during the second instruction cycle time.

2. A data system of the type including a processor element, an input/output device, and means for communicating data between the processor element and the input/output device, the processor element being operable in response to a clock signal formed by successive clock pulses to execute instructions in one of at least two instruction cycles, each having different time periods of execution, the input/output device being operable in response to a synchronized clock signal, apparatus for maintaining synchronization between the clock signal and the synchronized clock signal, comprising:

oscillator means for producing the clock signal;

state machine means operable in response to the clock signal and a control signal identifying an instruction cycle presently in execution to generate a first signal identifying a first and a second number of successive ones of the pulses of the clock signal respectively corresponding to a one or another of the instruction cycles, the processor element having means for providing the control signal;

clock generator means coupled to receive the clock and first signals to generate therefrom the synchronized clock signal that is proportional to the first number of successive ones of the clock pulses when a one of the two instruction cycles is being performed by the processor element or to the second number of successive ones of the clock pulses when another of the two instruction cycles is being performed by the processor element; and means coupling the synchronized clock signal to the input/output device.

* * * * *